United States Patent
Hopkins

(10) Patent No.: US 7,478,303 B2
(45) Date of Patent: Jan. 13, 2009

(54) SYSTEM AND METHOD FOR TESTING NODES IN A NETWORK

(75) Inventor: Doyle R. Hopkins, Windsor, CO (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 10/862,039

(22) Filed: Jun. 4, 2004

(65) Prior Publication Data

US 2005/0273681 A1 Dec. 8, 2005

(51) Int. Cl.
*G01R 31/28* (2006.01)
*G06F 11/00* (2006.01)

(52) U.S. Cl. .................. 714/734; 714/742
(58) Field of Classification Search .......... 714/716, 714/717, 56, 724, 742, 734
See application file for complete search history.

(56) References Cited

U.S. PATENT DOCUMENTS

| 5,321,813 | A * | 6/1994 | McMillen et al. ........... 714/798 |
| 6,147,967 | A * | 11/2000 | Ying et al. ................... 370/222 |
| 6,204,844 | B1 * | 3/2001 | Fumarolo et al. ........... 715/736 |
| 6,442,712 | B1 * | 8/2002 | Jeon ............................ 714/43 |
| 2002/0059545 | A1 * | 5/2002 | Nakashima et al. .......... 714/43 |
| 2003/0212932 | A1 * | 11/2003 | Sauber et al. ............... 714/712 |
| 2003/0226072 | A1 * | 12/2003 | Bruckman et al. .......... 714/716 |

OTHER PUBLICATIONS

"Reliability analysis of the double counter-rotating ring withconcentrator attachments" by Logothetis et al. This paper appears in: Networking, IEEE/ACM Transactions on Publication Date: Oct. 1994 vol. 2, Issue: 5 On pp. 520-532 ISSN: 1063-6692 INSPEC Accession No. 4833496.*

* cited by examiner

*Primary Examiner*—Cynthia Britt
(74) *Attorney, Agent, or Firm*—Strategic Patent Group

(57) ABSTRACT

A method and system for testing nodes in a network, where the network includes a plurality of nodes and at least one bus for coupling the plurality of nodes. The system includes a control processor for generating test commands to be sent to at least one node of the plurality of nodes and for receiving response data that is responsive to the test commands. The system also includes a back channel for coupling the control processor to the at least one node. The control processor uses the back channel to bypass the at least one bus during testing. According to the method and system disclosed herein, the present invention provides consistent and complete testing of nodes in a network, as well as significantly reduces test time from a manual 2 days to an automated 20 minutes or less.

46 Claims, 3 Drawing Sheets

SYSTEM AND METHOD FOR TESTING NODES IN A NETWORK

FIELD OF THE INVENTION

The present invention relates to networks, and more particularly to a system and method for testing nodes in a network.

BACKGROUND OF THE INVENTION

Networks are well known and are becoming increasingly popular as consumers connect computers and various digital devices, such as game stations, set-top boxes, digital audio/video equipment, and computer peripherals. Computers and electronic devices (hereinafter also referred to as nodes) in a network have a processor and transceiver configured to generate and receive data on the network. Nodes on a network intercommunicate via buses. Examples of popular buses used to link nodes are the universal serial bus (USB) and the high-speed serial bus known as Firewire or "1394."

Some digital devices such as Sony PlayStation2™ use an input/output processor (IOP), which has an integrated transceiver for generating and receiving data on a network. IOPs are well known. An IOP typically undergoes testing during production to determine whether it meets certain device/chip specifications. An IOP may also undergo testing if it is returned after failure in the field. A returned IOP is also referred to as a return material authorization (RMA) IOP. An RMA IOP is tested to determine what part of the chip failed. While field failures are generally undesirable, field failures can provide useful feedback. For example, recommendations can be made to design engineers for future design revisions. Recommendations can also be made to test engineers and production engineers for modifying the automatic test equipment (ATE) software to improve the screening of IOP chips. Such recommendations can result in a smaller defects per million (DPM) number for the IOP chips delivered to a customer.

Failure analysis of RMA IOPs involves manual testing of an IOP via a 1394 or a USB. A user types test commands into a computer. The test commands are sent to the RMA IOP, which sends a response back to the computer. The user can then analyze the response to possibly determine why the RMA failed in the field.

A problem with manual testing is that it can become boring for the user to manually perform the testing. Furthermore, manual testing introduces more room for human error. For example, a person testing a chip (also referred to as a device under test (DUT)) looks at individual bits from the results from the DUT test and compares those bits to bits from results from a reference/good chip. This can get tedious and when numerous registers and other components of a chip are being tested. Furthermore, the test time for manual testing is typically 2 days long. Consequently, misreading of the results can occur.

FIG. 1 is a block diagram of a conventional test system 50 for testing nodes in a network 52, which includes a plurality of nodes 54 and 56 and a bus 58 that couples the nodes 54 and 56. The node 54 is a DUT IOP board and includes a DUT IOP 60 and ports 62 and 64. The node 56 is a reference IOP board and includes a reference IOP 70 and a port 72. The bus 58, which is a 1394 bus, connects the nodes 54 and 56 at their ports 62 and 72. The test system 50 includes a network control computer 80, which has a communications port 82. The bus 66 can be connected to the communications port 82 to couple the network control computer 80 to the node 54 at the port 64.

During the testing of the DUT IOP 60, a user sends a test command packet, which includes test command data from the network control computer 80 to the node 54 through the bus 66 where the received test command packet is parsed to determine the kind of 1394 packets to generate. Information that is parsed includes the packet size and type, data content and address, speed, source node, and destination node. The 1394 packets are generated by node 54. Command response data is typically sent back to the network control computer 80 from either the DUT IOP 60 or the reference IOP 70 or both.

A problem with this method is that the buses 58 and 66 are assumed to be functioning properly. This would be expected since the packet containing the test command data is assumed to have been transmitted correctly and received correctly since every node on a 1394 bus sees a transmitted packet. The problem, however, is that test command data may become partially or even completely changed. Also, data within the test command packet may become corrupted. Also, erroneous packets may be generated, etc. Furthermore, even though there may not be any problems with 1394 bus alone, these problems may be caused by incompatibility where devices in the physical layer of the network may have compatibility problems with the 1394 bus.

Accordingly, what is needed is a reliable and complete test that decreases the chances of human error and/or bus errors during testing. The present invention addresses such a need.

SUMMARY OF THE INVENTION

The present invention provides a system and method for testing nodes in a network, which includes a plurality of nodes and at least one bus for coupling the plurality of nodes. The system includes a control processor for generating test commands to be sent to at least one node of the plurality of nodes and for receiving command response data that is responsive to the test commands. The system also includes a back channel for coupling the control processor to the at least one node, wherein the control processor uses the back channel to bypass the at least one bus during testing. In another aspect of the present invention, the testing process is automated to minimize the occurrence of human error during testing. In another aspect of the present invention, the test commands exercise all valid combinations of bits in the packets to provide a more thorough test.

According to the method and system disclosed herein, the present invention provides consistent and complete testing of nodes in a network, as well as significantly reduces test time from a manual 2 days to an automated 20 minutes or less.

DETAILED DESCRIPTION OF THE INVENTION

The present invention relates to networks, and more particularly to a system and method for testing nodes in a network. The following description is presented to enable one of ordinary skill in the art to make and use the invention and is provided in the context of a patent application and its requirements. Various modifications to the preferred embodiments and to the generic principles and features described herein will be readily apparent to those skilled in the art. Thus, the present invention is not intended to be limited to the embodiments shown, but is to be accorded the widest scope consistent with the principles and features described herein.

The present invention provides an automated test system for nodes in a network. A network control computer executes code that sends command information to a node through a backchannel thereby bypassing the network bus and eliminating testing problems that may arise if the bus is not functioning properly.

Although the present invention disclosed herein is described in the context of test systems involving IOPs, 1394 buses, and USBs, the present invention may apply to other test systems involving other types of chips and other types of buses and still remain within the spirit and scope of the present invention.

Figure 1:
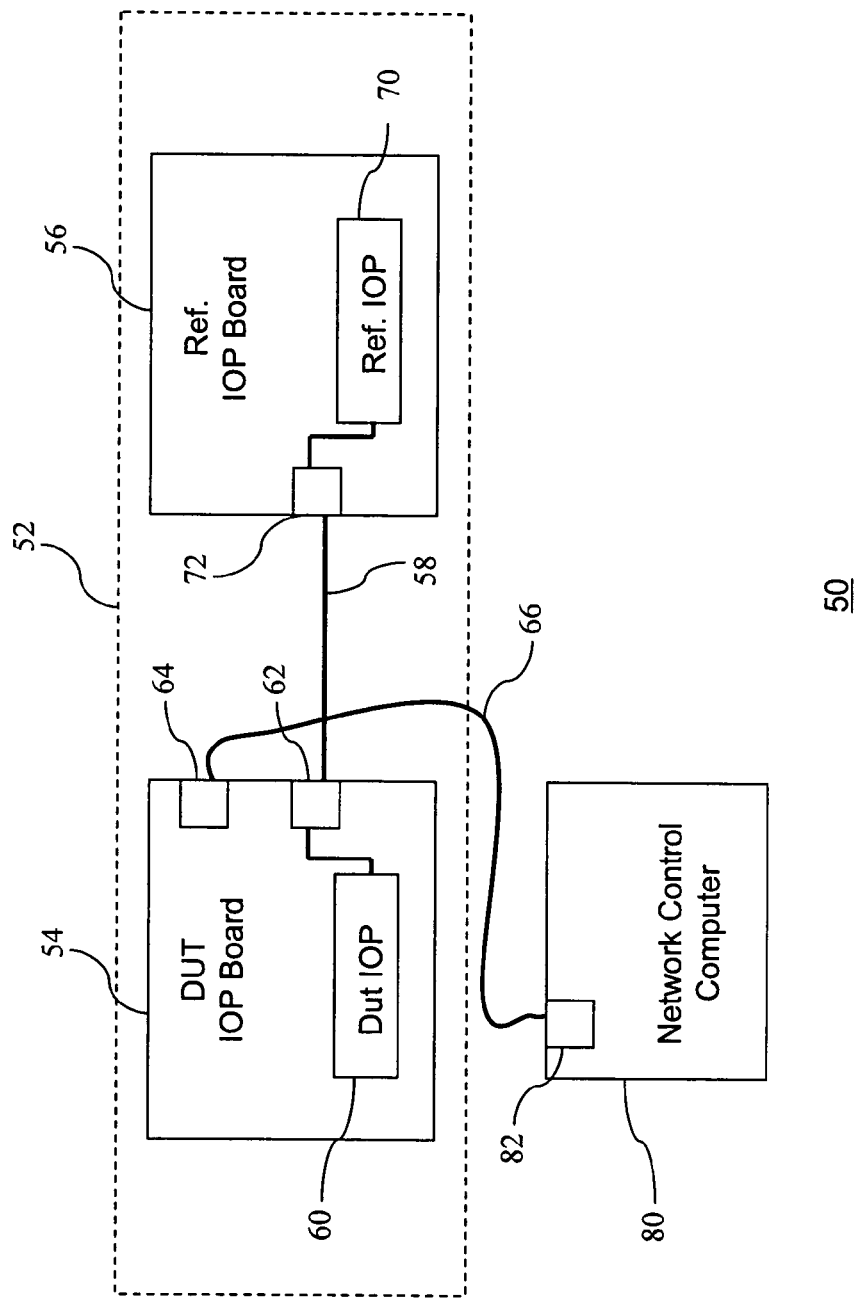
FIG. 1 is a block diagram of a conventional test system for testing nodes in a network.
Figure 2:
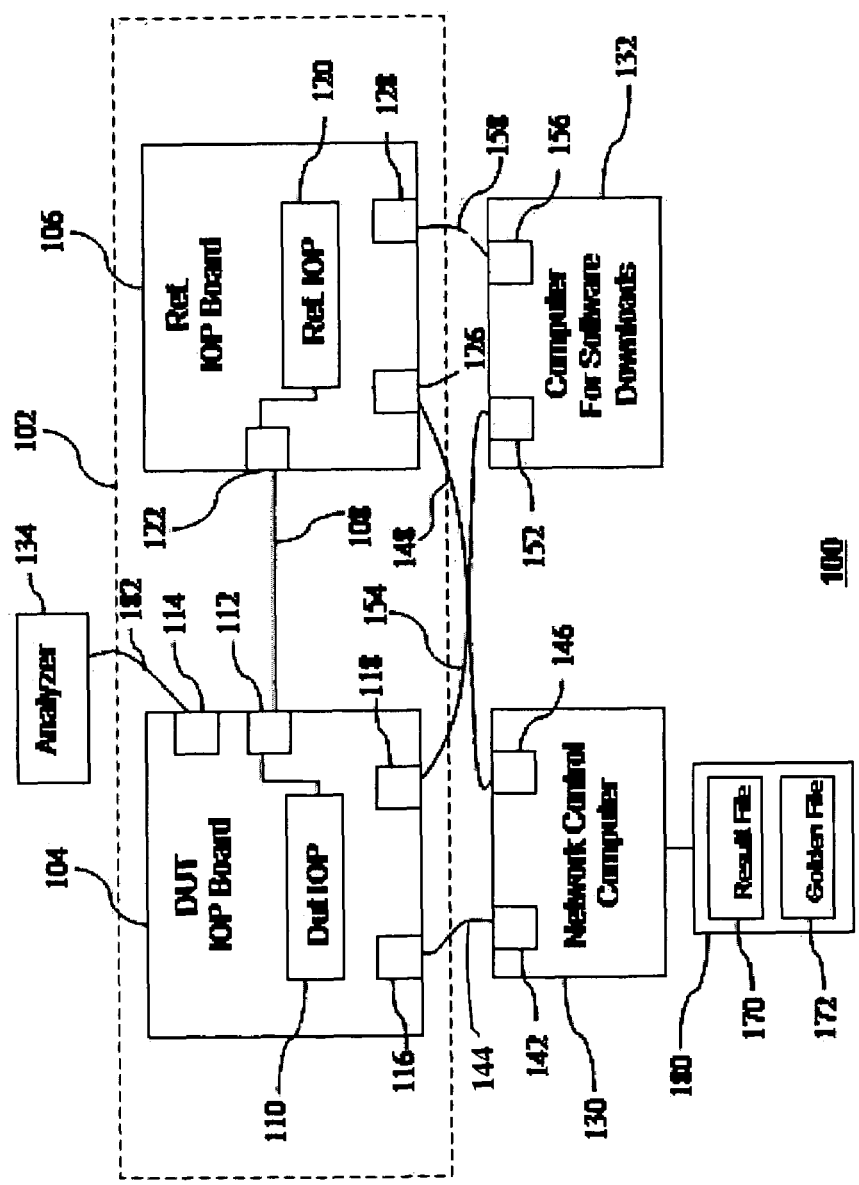
FIG. 2 is a block diagram of a test system for testing nodes in a network 102, in accordance with the present invention.

FIG. 2 is a block diagram of a test system 100 for testing nodes in a network 102, which includes a plurality of nodes 104 and 106 and a bus 108 that couples the nodes 104 and 106, in accordance with the present invention. In this specific embodiment, the node 104 is a DUT IOP board and includes a DUT IOP 110 to be tested, ports 112 and 114, and back channel connectors 116 and 118. Port 112 and port 122 are being tested while port 114 is being used to monitor what is happening on the 1394 bus. The DUT IOP 110 can be a new chip to be tested or a chip that has failed in the field. The node 106 is a reference IOP board and includes a reference IOP 120, a port 122, and back channel connectors 126 and 128. The bus 108 is a 1394 bus. Alternatively, the bus 108 can be a USB. The reference IOP 120 is a properly functioning IOP used as a benchmark for testing.

A computer 132 compiles and downloads the executable command interpreter to the DUT IOP board 104 using a back channel 154. The computer 132 is used to compile and download the executable command interpreter to the reference IOP board (node 106) using a back channel 158.

Figure 3:
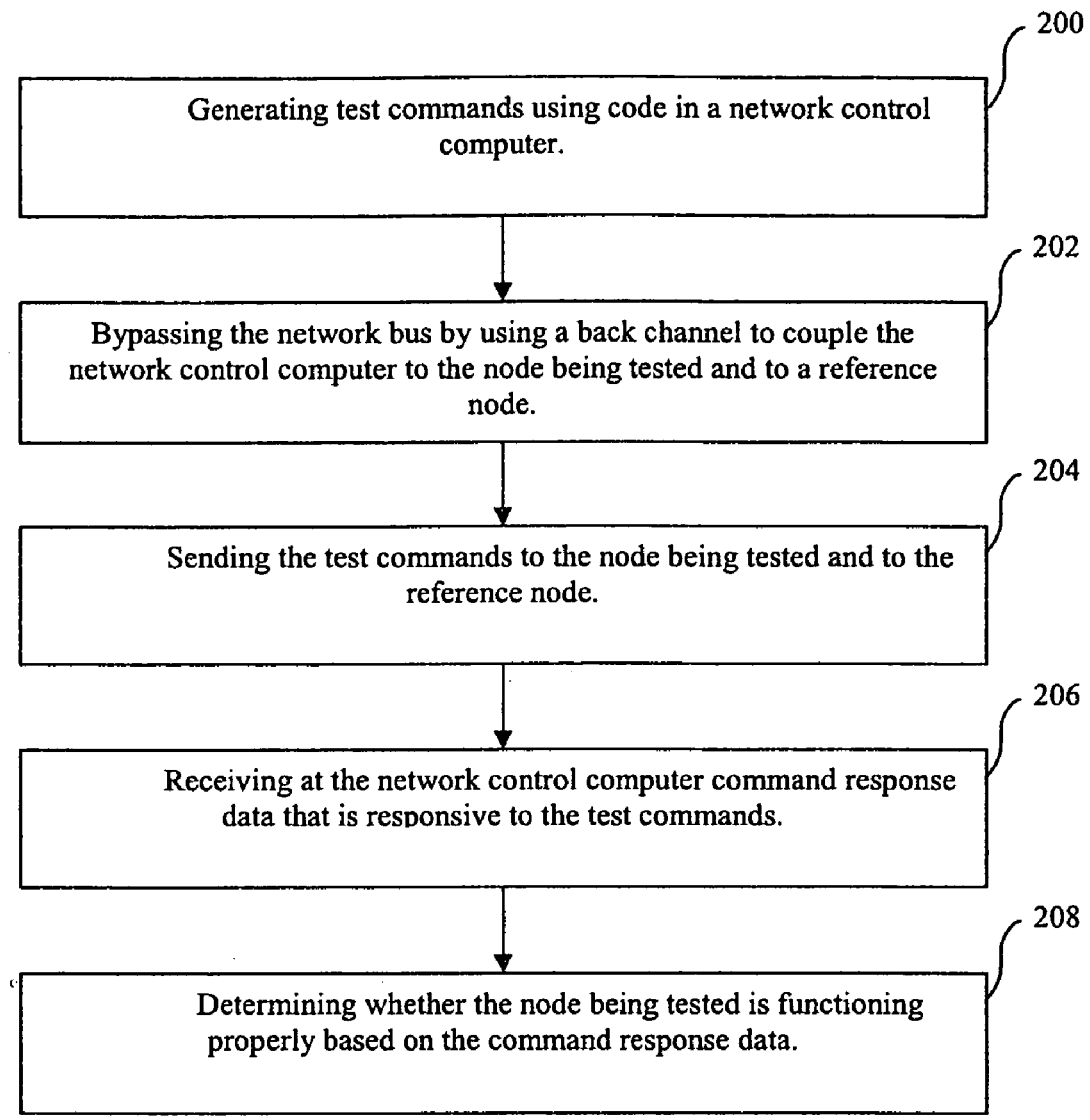
FIG. 3 is a flow chart showing a method for testing nodes in a network, in accordance with the present invention.

The test system 100 comprises a network control computer 130, the computer 132 for software downloads, and a 1394 bus analyzer 134. FIG. 3 is a flow chart showing a method for testing nodes in a network, in accordance with the present invention. Referring to FIGS. 2 and 3 together, code executed by the network control computer 130 generates test commands, in step 200. Next, the network bus 108 is bypassed by using a back channel 144 to couple the network control computer 130 to a node 104 being tested and using a back channel 148 to couple the network control computer 130 to a reference node 106, in step 202. Next, the test commands are sent to the node 104 being tested and to the reference node 106, in step 204. Specifically, the test commands are sent from a communication port 142 of the network control computer 130 through the back channel 144 to the back channel connector 116 of the DUT IOP 110. Also, a separate set of test commands are sent from a communication port 146 of the network control computer 130 through a back channel 148 to the back channel connector 126 of the reference IOP 120. Next, command response data from the test commands is received at the network control computer 130, in step 206. The command response data can come from the DUT IOP 110 or the reference IOP 120 or both IOPs 110 and 120. Finally, it is determined whether the node 104 is functioning properly based on the command response data, in step 208.

Preferably, the network control computer 130 executes command scripts that send test commands in a timed sequence to each node being tested. The command scripts control the flow of the test commands to a command interpreter in each node. In a specific embodiment, the command scripts are tool command language (TCL) scripts (commonly pronounced as "tickle" scripts). TCL is a scripting language for issuing commands and is well known. The TCL scripts send commands to the interpreters of each node in the proper sequence. For example, test commands may be sent to a first node and would not be sent to a second node until command response data from the first node has been received at the network control computer.

The test command data is transmitted and include specific instructions for generating the 1394 packets and the command response data is sent back to the network control computer 130. More specifically, the IOPs 110 and 120 receive the test commands, generate the 1394 packets, and send the command response data to the network control computer 130. In this specific embodiment, the packets are 1394 packets. Alternatively, the packets can be USB packets if the network 102 used a USB to couple the nodes 110 and 120.

In accordance with the present invention, the test commands instruct a node to perform specific operations, which include register reads/writes, bus resets, address translation, node identification, data verification, and packet tracing. As a part of the testing, a test command may also increase traffic in the network by instructing a node to originate request packets to be sent to other nodes, and so on. Accordingly, the command response data can be delivered to the network control computer 130 directly from the node being tested. Alternatively, the command response data may originate from the node being tested but be directed to the network control computer 130 through one or more other nodes. Also, the node being tested may be instructed to originate a request packet instructing another node to generate 1394 packets and command response data to be sent to the network control computer 130.

In another embodiment of the present invention, to provide a more thorough analysis the test commands exercise all valid combinations of bits in the packets, which the conventional test systems do not. An attempt is made to toggle (set or clear) every bit in the 1394 packet. Exercising all of the bits in the packets provides a more thorough test because hardware registers in the IOP are associated with most of the fields that make up the fields in a 1394 packet. Accordingly, the registers of a particular IOP are tested by exercising and analyzing the bits of a packet. Hence, problems can be isolated to determine the root cause of failures.

The command response data from the DUT IOP 110 is stored in a DUT results file 170, and the command response data from the reference IOP 120 is stored in a reference results file 172, also referred to as a "golden" file 172. The golden file 172 contains the commands and the correct response for each command. The golden file 172 typically does not change unless the test pattern changes. The DUT results file 170 and the golden file 172 are preferably stored in a separate storage unit 180. Alternatively, the DUT results file 170 and the golden file 172 can be store in the network control computer 130.

The command response data stored in the DUT results file 170 can then be compared to the command response data in the golden file 172. The code or application executed by the network control computer 130 determines whether the DUT IOP 110 and/or node 104 are functioning properly based on the comparison. If the two files 170 and 172 match, the DUT IOP 110/node 104 functions properly. Of course, if the two files 170 and 172 do not match, the DUT IOP 110/node 104 does not function properly, which would be expected if the DUT IOP 110 is an RMA/field failure.

The code executed by the network control computer 130 automates the generation and transmission of test commands and command response data, as well as automates the comparison of the DUT IOP results file 170 with the golden file 172. Automating the testing process can significantly reduce test time from 2 days (which is a typical test time for manual testing) to as little as 20 minutes or less. Also, by eliminating the need for manual testing, the occurrence of human error during testing is minimized. Alternatively, portions of the testing can remain manual, while other portions can be automated. For example, certain manual tests can be performed, while the results comparison is automatically performed. Furthermore, the automation capabilities provided by the present invention can be applied to other applications such as PVT process, voltage, and temperature (PVT) testing. As such, it can be determined if the voltage to or temperature of one part of a chip, node, or network runs higher or lower that what is normal or expected. Furthermore, the present invention can be used to analyze process variations in the semiconductor of a chip.

To make the test system 100 even more user-friendly, the network control computer includes a graphical user interface for allowing the execution of a network diagnostic test. Accordingly, the network control computer can determine whether an IOP/node is functioning properly based on the command response data resulting from a given diagnostic test.

By using the back channels 144 and 148 during testing, the network control computer 130 bypasses the bus 108. This is beneficial because it eliminates testing problems that may arise if the bus 108 is not functioning properly. A bus can fail to function properly for a number of reasons, many of which include hardware problems such as a failed or out-of-spec transistor. Testing problems can include misdelivery or nondelivery of packets. In other words, a faulty bus may lead to failure of basic operations. While it may seem that using the back channels 144 and 148 increase the complexity of the test system 100, as additional hardware and software are needed, the use of the back channels 144 and 148 actually simplifies the testing process by automating the testing process and eliminating problems associated with the existing conventional test systems.

The computer 132 stores software and downloads the software to the DUT IOP 110 from a communication port 152 through a back channel 154, which couples to the back channel connector 118. The software can include software upgrades for the DUT IOP 110. Similarly, the auxiliary computer 132 downloads the software to the reference IOP 120 from a communication port 156 through a back channel 158, which couples to the back channel connector 128. In this specific embodiment, the back channels 144, 148, 154, and 156 are RS232 cables. RS232 cables are very stable and reliable. RS232 cables are simple and if in the rare occasion there is a problem with an RS232 cable, it would be noticeable to the user during testing, unlike with the 1394 or USB buses where problems may or may not be noticeable. Using the back channels 154 and 158 during downloads is beneficial because it ensures that software is properly downloaded to the nodes 104 and 106, or is at least free from download errors caused by a faulty bus. A 1394 analyzer 134, which is coupled to the port 114 of the DUT IOP 110 via a bus 182, provides additional feedback to a user by enabling the user to analyze the behavior and transaction on the 1394 bus 108.

In an alternative embodiment, each of the nodes 104 and 106 includes a command interpreter, where the reception and generation of packets is handled by the command interrupter. In a specific embodiment, the command interpreter is integrated with the IOP of each node.

In accordance with the present invention, the test system 100 can be used for regression testing of a new version of a silicon chip. As such, a number of chips are tested, and the results for the chips are then compared to one another and/or to the results for a reference chip. If the reference chip is a prior version, it can be determined whether the current version behaves like the prior version. It can also be determined how the current version might behave differently from the prior version. Similarly, the test system 100 can be used for regression testing of RMA chips to characterize the behavior of various RMA chips. This would be useful, for example, in determining, understanding, and/or characterizing the root cause of a field failure.

In another embodiment of the present invention, a sequence of reads and writes to the registers in a DUT IOP responsive to the test commands are logged along with the command response data for each register access. This logged information can be stored for future use. For example, an ATE programmer can use ATE test software to perform the same identical test executed by C code. Without the logged information, additional code would have to be written.

According to the system and method disclosed herein, the present invention provides numerous benefits. For example, it provides consistent and complete testing of nodes in a network. Embodiments of the present invention also significantly reduce test time. Embodiments of the present invention also provide logged information to help those who are evaluating the test results to understand how the results were achieved.

A method and system for testing nodes on a network has been disclosed. The present invention has been described in accordance with the embodiments shown, and one of ordinary skill in the art will readily recognize that there could be variations to the embodiments, and any variations would be within the spirit and scope of the present invention. Embodiments of the present invention can be implemented using hardware, software, a computer readable medium containing program instructions, or a combination thereof. Software written according to the present invention is to be stored in some form of computer-readable medium, such as memory or CD-ROM, or is to be transmitted over a network, and executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

I claim:

1. A system for testing nodes in a network, the network including a plurality of nodes, the system comprising:
    at least one bus to couple the plurality of nodes and to send any commands to at least one of the plurality of nodes;
    a control processor to generate the test commands to be sent to the at least one node of the plurality of nodes and to receive response data that is responsive to the test commands, wherein the test commands include instructions to generate packets, and wherein the test commands exercise all valid combinations of the bits in the packets that are associated with testing registers; and
    a back channel to couple the control processor to the at least one node, wherein the control processor uses the back channel to send the test commands to the at least one node and to bypass the at least one bus during testing, wherein bypassing the bus during testing eliminates testing problems associated with sending the test commands to the at least one node using the at least one bus when the at least one bus is not functioning properly.

2. The system of claim 1 wherein the back channel is an RS232 cable.

3. The system of claim 1 wherein the control processor automates the generating and sending of test commands, and the receiving of results.

4. The system of claim 1 wherein the control processor determines whether the at least one node is functioning properly based on the response data.

5. The system of claim 1 wherein the response data is generated by the at least one node.

6. The system of claim 1 wherein the packets are 1394 packets.

7. The system of claim 1 wherein the packets are USB packets.

8. The system of claim 1 wherein the network control computer comprises a graphical user interface for allowing the execution of a network diagnostic test.

9. The system of claim 1 wherein each node of the plurality of nodes comprises a node processor that can generate and receive data on the network.

10. The system of claim 9 wherein the node processor is an input/output processor.

11. The system of claim 9 wherein the control processor sends test commands in a timed sequence to each node being tested, wherein the test commands comprise specific instructions to the node processor of each node being tested to generate the response data.

12. The system of claim 1 wherein the control processor determines the success or failure of a node based on the response data resulting from a given diagnostic test.

13. The system of claim 1 wherein the each node comprises a command interpreter.

14. The system of claim 1 wherein at each node, the reception and generation of packets is handled by the command interpreter.

15. The system of claim 1 wherein the control processor executes command scripts to control the flow of the test commands to the command interpreter.

16. The system of claim 15 wherein the command scripts are tool command language (TCL) scripts.

17. The system of claim 1 wherein the test system is applied to regression testing of a node that has a new version of a device.

18. The system of claim 1 wherein the test system is applied to regression testing of a node that has a returned material authorization device.

19. The system of claim 1 wherein the test system logs a sequence of reads and writes to registers responsive to the test commands.

20. A method for testing nodes in a network, the network including a plurality of nodes and at least one bus coupling the plurality of nodes and to send any commands to at least one of the plurality of nodes, the method comprising:
generating test commands using a control processor;
sending the test commands to the at least one node of the plurality of nodes using a back channel, wherein the back channel couples the control processor to the at least one node, wherein the at least one bus is bypassed during testing, wherein bypassing the at least one bus during testing eliminates testing problems associated with sending the test commands to the at least one node using the at least one bus when the at least one bus is not functioning properly, wherein the test commands include instructions to generate packets, and wherein the test commands exercise all valid combinations of the bits in the packets that are associated with testing registers; and
receiving response data that is responsive to the test commands by the control processor through the back channel.

21. The method of claim 20 wherein the response data is generated by the at least one node.

22. The method of claim 21 wherein the generating, sending, and receiving are automated.

23. The method of claim 21 further including determining whether the at least one node is functioning properly based on the response data.

24. The method of claim 21 wherein the sending further includes sending test commands in a timed sequence to each node being tested, wherein the test commands comprise specific instructions to a node processor of each node being tested to generate the response data.

25. The method of claim 24 wherein the node processor is an input/output processor.

26. The method of claim 24 wherein the each node comprises a command interpreter.

27. The method of claim 26 wherein during the sending further comprises handling the reception and generation of packets at each node using the command interpreter.

28. The method of claim 26 further including executing command scripts using the control processor to control the flow of the test commands to the command interpreter.

29. The method of claim 28 wherein the command scripts are tool command language (TCL) scripts.

30. The method of claim 20 wherein the method is applied to regression testing of a node that has a new version of a device.

31. The method of claim 20 wherein the method is applied to regression testing of a node that has a returned material authorization device.

32. The method of claim 20 further comprising logging a sequence of reads and writes to registers responsive to the test commands.

33. A computer readable medium containing program instructions for testing nodes in a network, the network including a plurality of nodes and at least one bus coupling the plurality of nodes and to send any commands to at least one of the plurality of nodes, the program instructions which when executed by a computer system cause the computer system to execute a method comprising:
generating the test commands using a control processor;
sending the test commands to the at least one node of the plurality of nodes using a back channel, wherein the back channel couples the control processor to the at least one node, wherein the at least one bus is bypassed during testing, wherein bypassing the least one bus during testing eliminates testing problems associated with sending the test commands to the at least one node using the at least one bus when the at least one bus is not functioning properly, wherein the test commands include instructions to generate packets, and wherein the test commands exercise all valid combinations of the bits in the packets that are associated with testing registers; and
receiving response data that is responsive to the test commands by the control processor through the back channel.

34. The computer readable medium of claim 33 wherein the response data is generated by the at least one node.

35. The computer readable medium of claim 33 wherein the generating, sending, and receiving are automated.

36. The computer readable medium of claim 33 further including program instructions for determining whether the at least one node is functioning properly based on the response data.

37. The computer readable medium of claim 33 wherein the medium is applied to regression testing of a node that has a new version of a device.

38. The computer readable medium of claim 33 wherein the medium is applied to regression testing of a node that has a returned material authorization device.

39. The method of claim 33 further comprising program instructions for logging a sequence of reads and writes to registers responsive to the test commands.

40. The computer readable medium of claim 33 wherein sending further includes program instructions for sending test commands in a timed sequence to each node being tested, wherein the test commands comprise specific instructions to the node processor of each node being tested for generating the response data.

41. The computer readable medium of claim 40 wherein the node processor is an input/output processor.

42. The computer readable medium of claim 40 wherein the each node comprises a command interpreter.

43. The computer readable medium of claim 42 wherein during the sending further comprises program instructions for handling the reception and generation of packets at each node using the command interpreter.

44. The computer readable medium of claim 42 further including program instructions for executing command scripts using the control processor to control the flow of the test commands to the command interpreter.

45. The computer readable medium of claim 44 wherein the command scripts are tool command language (TCL) scripts.

46. A system for testing nodes in a network, the network including a plurality of nodes, the system comprising:
at least one bus to couple the plurality of nodes and to send test commands to the plurality of nodes;
a control processor to generate test commands to be sent to the plurality of nodes and to receive response data that is responsive to the test commands, wherein the test commands include instructions to generate packets, and wherein the test commands exercise all valid combinations of the bits in the packets that are associated with testing registers, wherein the control processor sends test commands in a timed sequence to each node of the plurality of nodes, wherein the test commands comprise specific instructions to the node processor of each node to generate the response data; and
a back channel to couple the control processor to each node of the plurality of nodes, wherein the control processor uses the back channel to send the test commands to the plurality of nodes and to bypass the at least one bus during testing, wherein bypassing the bus during testing eliminates testing problems associated with sending the test commands to the at least one node using the at least one bus when the at least one bus is not functioning properly.

* * * * *